No. 750,196. PATENTED JAN. 19, 1904.
G. KAUTZ, Sr.
DUMPING WAGON.
APPLICATION FILED JAN. 20, 1903.
NO MODEL. 2 SHEETS—SHEET 1.
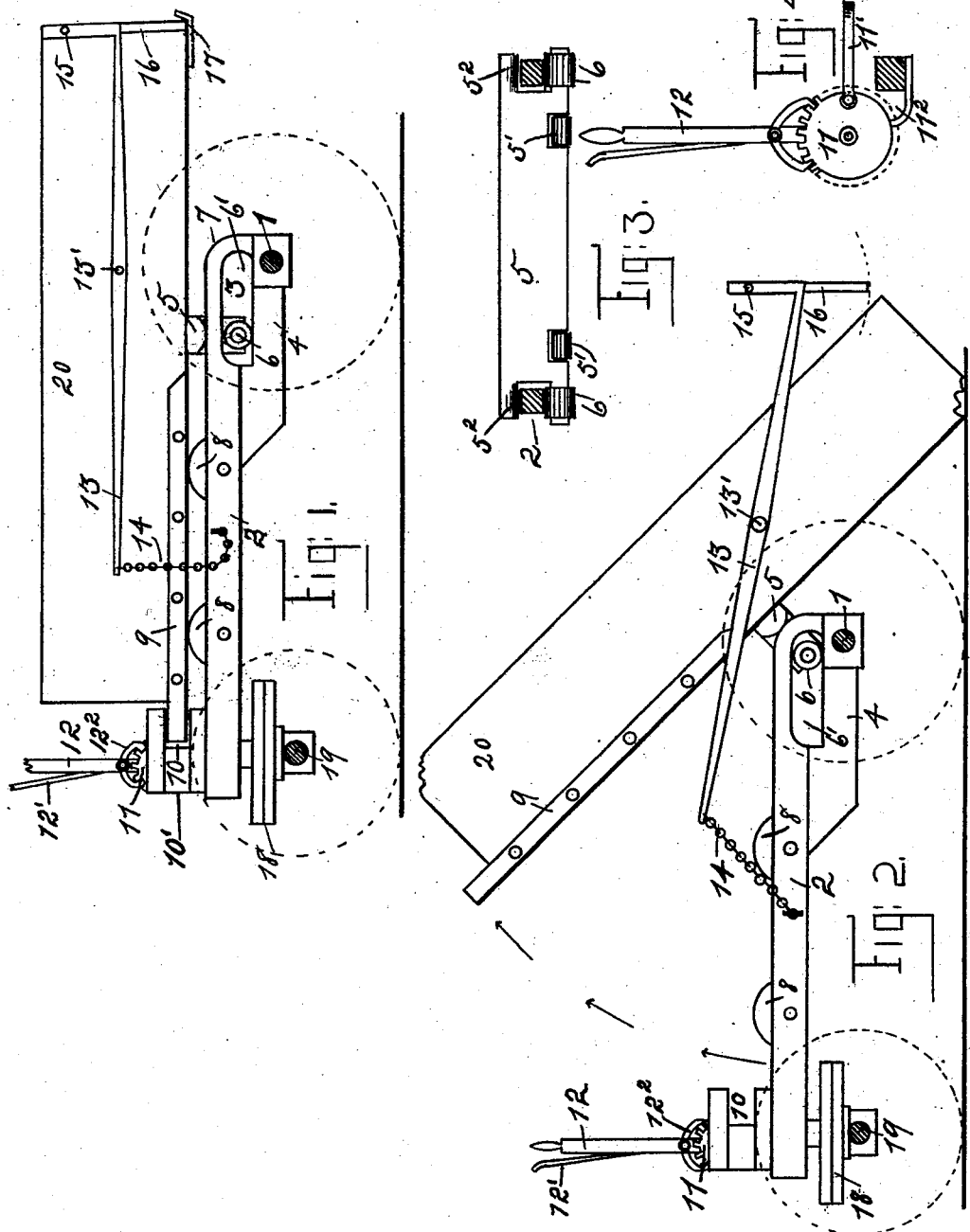
Witnesses:
J. F. Harris.
A. M. Turner.
Inventor:
George Kautz Sr.
By H. M. Brown
his Atty.

No. 750,196. PATENTED JAN. 19, 1904.
G. KAUTZ, Sr.
DUMPING WAGON.
APPLICATION FILED JAN. 20, 1903.
NO MODEL. 2 SHEETS—SHEET 2.
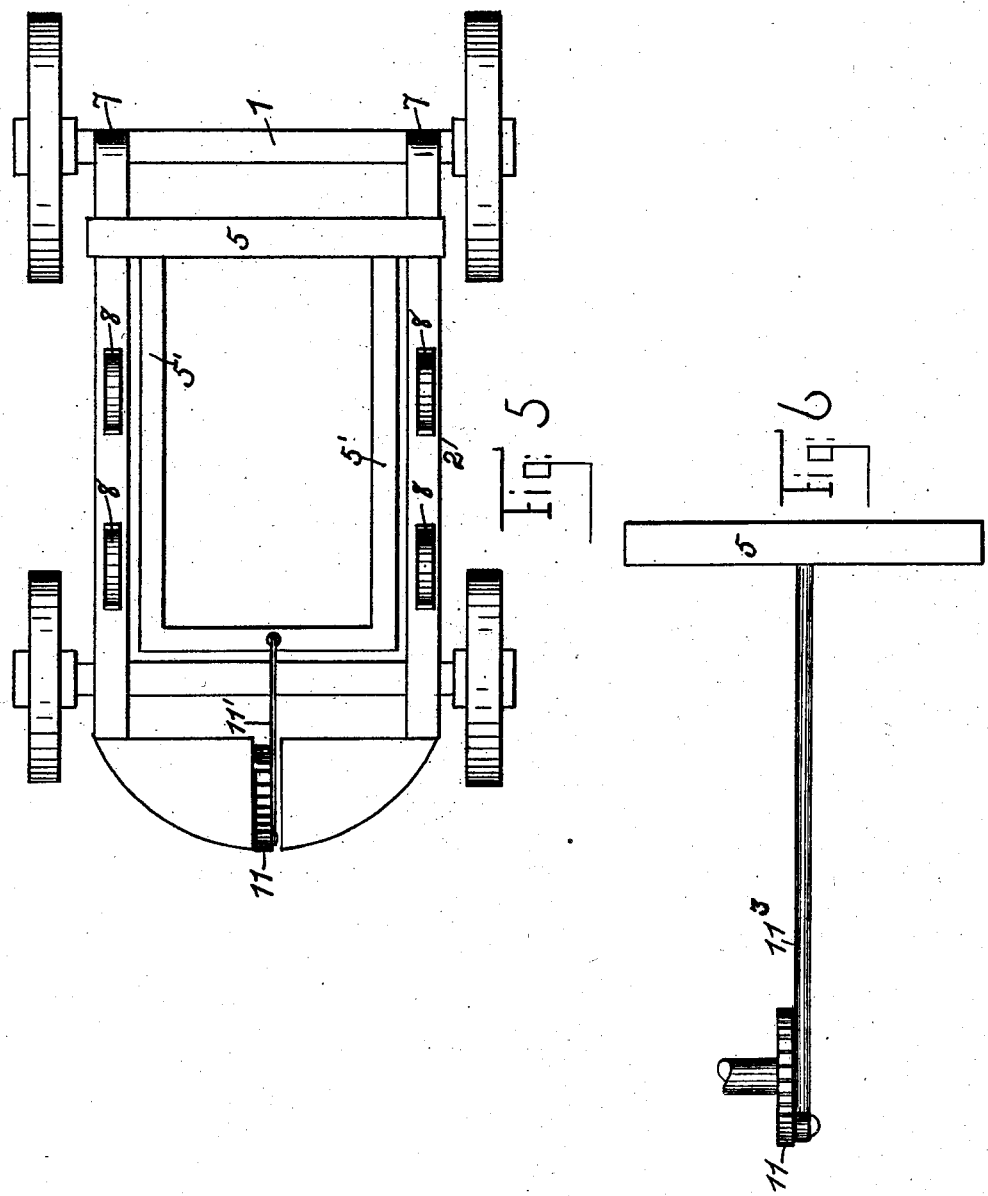
Witnesses:
J. F. Harris:
A. M. Turner
Inventor:
George Kautz Sr.
By H. M. Brown.
his Atty No. 750,196. Patented January 19, 1904.

UNITED STATES PATENT OFFICE.

GEORGE KAUTZ, SR., OF ALBANY, NEW YORK, ASSIGNOR TO HULDAH M. KAUTZ, OF ALBANY, NEW YORK.

DUMPING-WAGON.

SPECIFICATION forming part of Letters Patent No. 750,196, dated January 19, 1904.

Application filed January 20, 1903. Serial No. 139,764. (No model.)

*To all whom it may concern:*

Be it known that I, GEORGE KAUTZ, Sr., a citizen of the United States, residing at Albany, New York, have invented certain new and useful Improvements in Dumping-Wagons; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to that class of wagons known as "dumping-wagons," and especially to that class known as "rear-end" dumpers.

In my invention herein illustrated and described one of the principal objects I have striven to attain is a wagon having a box low down, so as to be easily filled with shovels, lessening the labor of those filling them, and also to provide a rearward-moving box that is easily slid along the frame and dumped. I have accomplished these objects, among others, by the invention shown in the drawings, wherein—

Figure 1 shows a side elevation of my wagon ready to be filled; Fig. 2, a similar view showing the wagon as in the act of dumping its load; Fig. 3, a rear plan view of the rear bolster to which the box is made fast; Fig. 4, a side elevation of the mechanism for sliding the box rearward and drawing it forward; Fig. 5, a plan view of the wagon, showing the rear bolster and the mechanism for so sliding it; and Fig. 6, a plan view of equivalent mechanism to produce the same results as shown in Fig. 5.

The numeral 1 shows the rear axle, resting on which is seen the frame or side stringer 2, said stringer having a portion cut away or so formed as to produce a portion of the opening 6', the lower portion being supplied by the reinforce-piece 4, a portion of that piece also being formed for that purpose. In this opening 6' rests and travels the wheel 6, which is revolubly affixed to the end of the rear bolster 5, as clearly seen in Fig. 3, the end of the bolster being formed so as to embrace a portion of the stringer 2, the upper prong, resting on this stringer, being rounded, so that when the box is slid rearward this rounded surface will roll rearward over the rounded end 7 of the stringer 2, thus assisting the dumping movement of the box 20. This rearward and forward movement of the box is accomplished by the toothed wheel 11, which has a rod or link 11' held movably to the toothed wheel 11 by a pin, said link 11' being affixed movably to the propelling-frame 5', as seen in Fig. 5, the point of fixture to the frame having a tipping motion to accommodate the movement of the link 11' as its forward end rises and falls by the motion of the toothed wheel 11. As is shown in Fig. 6, the wheel is journaled on one side only, so as to allow full sweep to the link $11^3$, which link may be used in place of the frame 5', if desired, and which is an equivalent of the frame.

To the toothed wheel 11 is operatively connected the levers 12 and 12', which are the usual form of levers used for rotating such wheels, said levers having grips or claws $12^2$, operating in the usual manner for rotating said wheel. Underneath said toothed wheel 11 is a resilient catch or dog $11^2$, whose office is to prevent the toothed wheel 11 from turning in but one direction by its end catching against the teeth when the wheel is attempted to be turned rearward and sliding over them when turned forward. (See Fig. 4.) It will be seen that by turning the wheel until it has made a continuous revolution one-half such revolution will slide the box into dumping position, (see Fig. 5,) and by continuing the revolution the box will be drawn forward again into loading position, and that spring-catch $11^2$ will prevent any but this forward motion, and that when the box is in loading position, as seen in Fig. 5, the link 11' is at dead-center, and any rearward pull or tendency of the box to slide rearward cannot start the wheel 11, nor will spring-catch $11^2$ allow its movement in the opposite direction.

The rearward ends of the frame 5' will be seen to clasp around an iron bar set in the under side of the bolster or journals otherwise formed thereon at a point below the longitudinal axis of the bolster, so that the box and rear bolster may be forced forward and rearward in the easiest possible manner and without straining the bolster or having a tendency to tip it before the box dumps nor after it has begun its travel back to its loading position, and this point of attachment of the frame 5' is important, as any draw or push given the frame brings the purchase at the most advantageous point in relation to the bolster, and the same is true of the equivalent rod 11³. In order that the box may slide rearward easily, wheels 8 8 are preferably set in the stringer 2, upon which the box rests and rolls, as seen in Fig. 1, the piece 9 being fixed to the box and on each side thereof and having its forward end extending beyond the front end of the box. The footboard of the wagon 10' is formed with a recess 10 therein of sufficient capacity to receive the forward end of the piece 9 entering the cavity when the box is in loading position, said entered end preventing the box from tipping when in that position.

The rear end of the box 20 is preferably beveled, being slightly longer at the bottom than at the top, and has a tail-board 16 swingingly attached to the arm 13, which is pivoted at 13' to the upright on that arm and chained at its other end, as seen at 14. This is so arranged that when the box attempts to dump it carries the arm with it rearward; but as soon as the tipping of the box reaches a certain degree the chain is drawn taut and will not allow the rear end of the arm to fall farther, which compels the tail-board to remain suspended free of the box end and hangs swingingly on the end of the upright on the arm. This allows of the tail-board readily adjusting itself to the open end of the box when the box is tipped into loading position again and allows of the tail-board being swung outwardly from the box when the box is but a trifle tipped, so as to remove anything from the rear end without fully tipping it. At the rear and under end of the box is a catch 17, arranged so as to force the tail-board into tight contact with the box when it drops into place, the rearward-slanting face of the catch producing the proper pinch or squeeze upon the under edge or side of the tail-board.

In operating my dumping-wagon the driver pulls the levers 12 and 12' in the usual manner back and forth, this movement when the box is in the position shown in Fig. 1 forcing the box rearward until it dumps and takes position as seen in Fig. 2. The box is now tipped into horizontal position by hand, when the further operation of the levers will draw it into the position seen in Fig. 1 again, when it may be loaded.

19 shows the front axle, and 18 the fifth-wheel.

In order to obtain a very low wagon-box, I have arranged the bolster 5 as seen, so its bearing end, which is the wheel 6, may be lowered and put in contact with the side frame stringer 2 at a point lower than the bottom surface of the stringer, and for that reason have made the opening 6' in the side of the stringer and set the bearing end, the wheel 6, so as to run in that opening. In the drawings will be seen the rounded under surface of the top horn 5² of the bolster apparently resting on the top surface of the stringer; but in fact it does not touch it, but rests just above that surface. If I desired to get a still lower box, I would simply deepen the opening 6' and cut still further away the rounded under surface of the horn 5², letting the box rest lower down than it is shown in the drawings, and if a very low box is desired I still further deepen the opening 6' and omit the horns entirely and let the box rest inside the frame or stringers 2, and in this manner get a box as low down as it will possibly go and have room to tip at a suitable angle for dumping. This is one of the principal points in my invention, as a low-down dumping-wagon is a desideratum long sought, but not yet successfully accomplished in any wagon other than that shown in the drawings and described herein.

By using the smallest wheels possible that are useful for heavy haulage and by arranging my side frames and my bolster as shown and herein described I am able to produce a dumping-wagon whose box can be set as low down as may be desired, providing it is still high enough to allow of giving the requisite pitch or inclination to the box when it is in dumping position.

Having described my invention, what I claim is—

1. In a dumping-wagon a box attached to a bolster arranged to have a backward and forward movement and to rest and rock on the stringers or wagon-frame; actuating devices pivotally attached to said bolster and arranged to move the bolster back and forth; a wheel arranged to operate in one direction only; a link or rod connected with the wheel and with the actuating device all operating so that when the wheel is revolved the bolster with the box will be drawn backward and forward at will substantially as described.

2. In a dumping-wagon a box arranged to move forward and rearward; a moving and tipping bolster to which the box is attached; antifriction devices in connection with said bolster and on which it moves and a track for them to run on lower than the lower side or surface of the side stringer of the wagon and means for moving said box and bolster substantially as described.

3. In a dumping-wagon a frame or side stringer having an opening in its rear end; an antifriction device arranged to move in said opening, said antifriction device being operatively attached to a bolster, said bolster having an opening in its end in which rests a portion of the frame or side stringer, and a projection resting over the frame or side stringer, and having a rounded under surface; the rear end of the stringer rounded, all arranged and operating so that the bolster may move backward and forward and roll over the rounded end of the stringer substantially as described.

4. In a dumping-wagon a box attached to a bolster; the bolster resting and moving in a recess or opening in the stringer or wagon-body at a point below the top surface of said frame or body; antifriction devices arranged in said recess and moving therein and operatively attached to the bolster, the bolster having a rocking motion and arranged to allow the box to dump substantially as described.

5. In a dumping-wagon a box having a projection at its forward end; a foot board or member having an opening as 10 therein; means for sliding or moving the box forward and rearward, all arranged so that when the box is in its forward position the projection will rest in contact with the foot board or member and the box be prevented from tipping substantially as described.

6. In a dumping-wagon a box and a single bolster attached thereto, said bolster having antifriction devices in operative connection therewith; a wagon-frame having openings or recesses formed therein arranged to receive and allow of movement of the antifriction devices therein, all arranged and operating so that the box may be moved back and forth in relation to the frame and be caused to dump its load at will substantially as described.

7. In a dumping-wagon a box having a rear bolster and antifriction devices operatively connected therewith; a wagon-frame consisting of side stringers and a member as 4 connected therewith; an opening or recess as 6', the antifriction devices moving in said recess, and rollers or their equivalents as 8 attached to the wagon-body all arranged and operating so that the box may be moved forward and rearward and dumped at will substantially as described.

8. In a dumping-wagon means for moving the box lengthwise the wagon body or frame consisting of a movable and tipping bolster carrying the wagon-box; actuating-rods as 5 or their equivalents pivoted to the bolster at a point below its longitudinal axis; a revoluble member or wheel attached to the wagon frame or body and means for revolving it in one direction only; an arm or connecting-rod operatively attached to the revoluble member and to the actuating-rods, all arranged and operating to force the box and bolster lengthwise the wagon-body and allow the box and bolster to tip when in the act of dumping the load substantially as described.

9. In a dumping-wagon a rear bolster arranged to move lengthwise the wagon-body and having a tipping or rocking motion and a bar or its equivalent pivoted to the rear bolster at a point below the longitudinal axis of the bolster by which the bolster is forced back and forth and means for actuating the bar or its equivalent substantially as described.

10. In a dumping-wagon a rear bolster arranged to move lengthwise the wagon-body and having a tipping or rocking motion and a bar or its equivalent movably attached to the rear bolster at a point below the longitudinal axis of the rear bolster and arranged to allow the bolster to rock or tip and means for actuating the bar and bolster substantially as described.

In testimony whereof I affix my signature in presence of two witnesses.

GEORGE KAUTZ, Sr.

Witnesses:
ERNEST C. FASOLDT,
W. M. BROWN.